Jan. 18, 1966 R. S. WEBB 3,230,412
SERVO FEED APPARATUS FOR ELECTRICAL DISCHARGE MACHINING
Filed Nov. 2, 1962 4 Sheets-Sheet 3

INVENTOR.
Robert S. Webb.
BY
Harry R. Dumont
ATTORNEY.

Jan. 18, 1966 R. S. WEBB 3,230,412
SERVO FEED APPARATUS FOR ELECTRICAL DISCHARGE MACHINING
Filed Nov. 2, 1962 4 Sheets-Sheet 4

INVENTOR.
Robert S. Webb
BY
Harry R. Dumont
ATTORNEY.

United States Patent Office 3,230,412
Patented Jan. 18, 1966

3,230,412
SERVO FEED APPARATUS FOR ELECTRICAL
DISCHARGE MACHINING
Robert S. Webb, Bloomfield Hills, Mich., assignor to Elox
Corporation of Michigan, Troy, Mich., a corporation
of Michigan
Filed Nov. 2, 1962, Ser. No. 234,973
30 Claims. (Cl. 314—61)

This invention relates generally to fluid actuator systems and to fluid actuator systems utilized in servo feed apparatus for electrical machining and electrical discharge machining, in particular.

Electrical machining or EM refers to the general field of machining in which electricity is used in some form as the actual machining tool for eroding a shape in a conductive workpiece. Examples of electrical machining are electrical discharge machining, electrochemical machining, electrolytic grinding, electron beam machining, arc cutting and electropolishing.

Electrical discharge machining, sometimes referred to in the art as EDM, spark machining, or arc machining is carried on by passing a series of discrete, localized, extremely high current density discharges across a gap between a conductive tool electrode and a conductive workpiece at sonic or ultrasonic frequencies in the presence of a dielectric fluid for eroding the workpiece.

Fluid actuated servo feed systems have certain basic advantages over servo feed systems of the mechanical or electromechanical type. Among these advantages are greater speed of response, much greater output forces, and lower control power requirements.

The outstanding disadvantage of fluid actuated servo feed systems is their instability at null or static conditions. This instability results in drift or mechanical motion in the output of the system. During setup of a precise machining operation, it is necessary for the element which is normally servo fed to be set in a stationary position. This stationary position is required for mechanical setup and correct alignment of parts and tools and for setting of the various feed limit stops required for precision control of the operation. Mechanical movement of the output at this time makes it impossible to achieve proper setup. Furthermore, during the servo control operation it is generally desirable to have three clear-cut conditions of motion; advance, null or stationary condition, and retraction. Instability about null makes it virtually impossible to set up a system for clear-cut operation in these three distinct movements. Conditions contributing to unbalance at the null condition include temperature drift of the hydraulic system, changes in operating pressure, deadband or hysteresis within the servo valve, changing static friction characteristics of the system, different static loads for different size and weight of fixtures and tooling, and different dynamic loads resulting from tool force or, in electrical discharge machining, from coolant force between the electrode and workpiece. Other factors contributing to change in null characteristics of the system are varying leakage past the piston in the cylinder actuated system and dirt or contamination within the system becoming lodged in a critical port of the servo valve or within hydraulic seals within the piston or other moving parts of the system.

Another outstanding disadvantage in the use of fluid actuated servo feed systems is that they have an inherent backlash characteristic. The presence of this backlash characteristic in electrical discharge machining, as in any precise machining operation, presents a particularly serious problem. For example, where the operation is of the finishing type, the approximate maximum feed rate of 30 inches per minute frequently falls to about .000001 inch per minute. When the electrode approaches the workpiece, the actual machining may begin in response to a sensing circuit at the optimum gap at about .003 inch. The servo must establish a null condition and, thereafter, feed at a very slow rate. It will be seen that, if there is appreciable backlash in the system, the electrode will overrun the optimum gap distance and backup will result. Upon backup, the backlash will cause overrun in the opposite direction and a continuous hunting action may be set up which is deleterious to the stable operation of the electrical discharge machining apparatus.

The prime object of my invention is to overcome operating deficiencies of the above-described type which may occur in hydraulically actuated servo feed systems, to improve their stability of operation and, yet, retain their characteristic advantages.

Another object of my invention is to provide a fluid actuator system which has null stability of operation approaching that of a mechanical system, which object is obtained solely by fluid biasing means.

It is an additional object of my invention to provide an improved, hydraulically actuated, servo feed system in which a predetermined threshold of operation of the hydraulically actuated motor may be precisely determined.

It is a further object of my invention to provide an improved, hydraulically actuated, servo feed system in which the null position of the motive element of the hydraulically actuated system may be selectively varied by simple and readily adjustable fluid control means.

It is a further object of this invention to provide an improved, hydraulically actuated, servo feed system in which a force balancing system is employed by way of controlled fluid pressure to maintain the motive element of the system stationary in the null and near null states of the directional control means determining its movement.

It is a further object of my invention to provide an improved servo feed system particularly effective in precise positioning of a tool relative to a workpiece as required in the operation of precision machine tools such as electrical discharge machining apparatus.

It is a further object of my invention to provide an improved servo feed system for use in connection with electrical discharge machining apparatus in which an electrical control is maintained responsive to gap voltage.

It is a still further object of my invention to provide an improved electro-hydraulic servo feed system for use in connection with electrical discharge machining apparatus in which the servo system is both electrically and hydraulically stabilized in its operation.

The foregoing objects and still others, together with the advantages of the present invention, will become apparent upon consideration of the accompanying drawings in which:

FIGURE 6 is a diagrammatic view of an alternate system utilizing the present invention in connection with a hydraulic motor of the rotary type;

Figure 1:
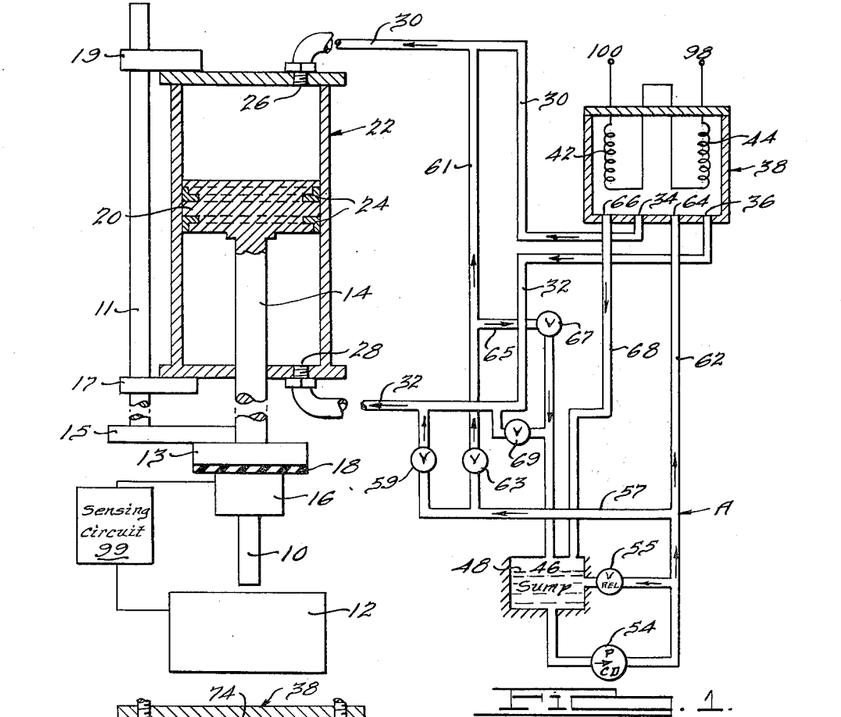
FIGURE 1 is a schematic view of an electro-hydraulic servo feed system constructed in accordance with my invention employing a cylinder shown in vertical section to disclose the detail of its construction.

With reference to FIGURE 1, it will be seen that I have shown a fluid actuator system herein embodied as a power feed system for an electrode 10 which is intended to be fed toward a workpiece 12 for machining the same by intermittent electrical discharge. It will be understood that a dielectric fluid is usually maintained in the gap provided between electrode and workpiece in electrical discharge machining. It will further be apparent that, while the present invention is described as showing a hydraulic servo system for moving an electrode with reference to a stationary workpiece, it may as readily be applied to a hydraulic servo system in which the electrode is maintained stationary and the workpiece is moved toward and away from the electrode with a simple reversal of parts and motion. Electrode 10 is secured to a piston rod 14 by a suitable holder 16 which is electrically insulated from the rod by an insulating member 18. A guide bar 11 is secured to a platen 13 by support 15 and therefore is carried by the motion of rod 14. Guide blocks 17 and 19 are mounted at opposite ends of cylinder 22 to provide an external arrangement to prevent the rotation of rod 14. It is understood that this guide bar arrangement may be replaced by a ram and V-way construction well known in the machine tool field. The rod 14 is carried by a power feed piston 20 disposed and differentially positionable in a cylinder 22. Piston 20 is provided with peripheral seals 24 of a suitable resilient material. Fluid inlet-outlet ports 26, 28 are disposed in the respective cylinder heads, these ports being connected through conduits 30, 32 to a directional control valve 38 of the four-way type, that is, having four conduit connections; one from the pressure source, a second to the reservoir or sump, and the other two control lines connected, respectively, to each end of the work cylinder. Directional control valve 38 is controlled in its operation by a pair of electro-magnetic coils 42, 44 and has a mode of operation which will be described in detail with reference to FIGURE 2, hereinafter.

The fluid circuit comprises a reservoir or sump 46 which contains fluid 48. The fluid 48 is drawn from sump 46 by a constant pressure delivery pump 54. The pump, which may typically operate in a range of 500–3000 p.s.i., forces the fluid in flow paths indicated by arrows on the various figures of the drawings. It will be noted that, downstream of pump 54, is a relief valve 55 operable to assist in effectively maintaining a source of constant pressure fluid. Operating pressure from pump 54 is furnished through conduit 62 to input port 64 of valve 38. Suitable filter elements may be incorporated in the pressure system as required. The pressure system is completed from valve 38 through conduits 30 and 32 which are connected to the respective heads of cylinder 22. Exhaust flow from valve 38 is provided through valve port 66 into conduit 68 which returns the fluid to sump 46. As will be seen from FIGURES 1 and 2, the valve 38 is electrically controlled by the operation of a pair of selectively energized coils 42, 44. The control signals, which are of variable amplitude of signal and polarity at terminal points 98 and 100, originate from a sensing circuit 99 which is utilized to sense the position of the electrode 10 with respect to workpiece 12 as indicated by an electrical characteristic of the gap. The output of the sensing circuit provides a signal to the servo system when downfeed or backup is necessary to maintain optimum gap distance between electrode 10 and workpiece 12. Sensing circuit 99 will be shown and described in FIGURE 5, hereinafter.

FIGURE 1 further shows the means utilized in the present invention for applying the balancing pressure at null to maintain piston 20 stationary. Conduit 57 is connected between a point of predetermined fixed pressure at point A, in the present instance, a junction with conduit 62 downstream of relief valve 55, and inlet port 28 at the lower head of cylinder 22. Connected in conduit 57 is a flow control valve 59 for adjusting the flow of fluid to the lower face of piston 20. An additional conduit 61 is connected communicating between conduit 57 and inlet port 26 in the upper head portion of cylinder 22. Conduit 61 has connected therein a flow control valve 63 for presetting the flow of fluid to the upper face of piston 20. A third conduit 65 serves the purpose of an exhaust from conduit 61 and has connected therein a flow control valve 67 to control the fluid flow to sump 46. A fourth flow control valve 69 connects from conduit 32 to sump 46 and is required in certain instances as will be explained in the section "Description of Operation" hereinafter. It will be seen that the selectively preset flow through valves 59, 63, 67 and 69 in conjunction with static friction normally opposing movement of the piston 20 provides a force balanced system. This system will serve to maintain the piston 20 in its own fixed and stable null location both at and near the null condition of servo valve 38 as determined by the central and near central positioning of spool 40 therein.

Figure 2:
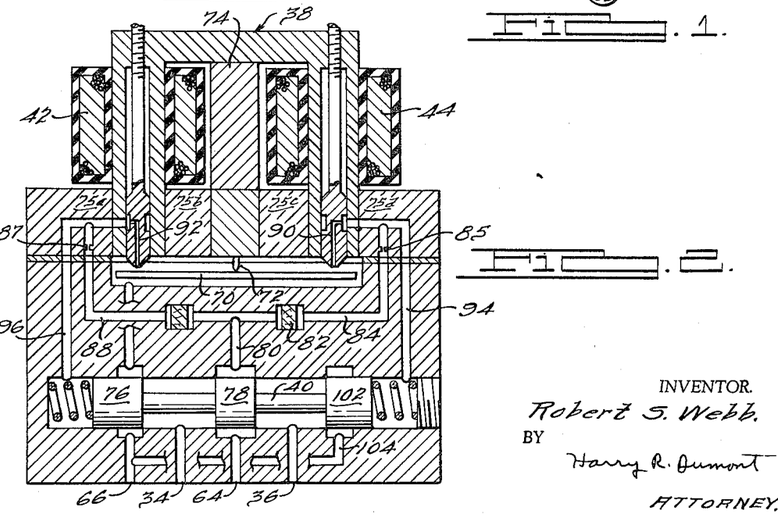
FIGURE 2 is a detail, sectional view on an enlarged scale of the directional control valve utilized in the hydraulic servo feed system of FIGURE 1.

FIGURE 2 shows the detail of the elements of directional control valve 38 including the pair of electrically energizable coils 42 and 44 which control the operation of valve 38 and the subsequent movement of piston 20 in response to the electrical output of sensing circuit 99 as received at terminals 98 and 100 of FIGURE 1. Coils 42, 44 may be connected in series, parallel, or in "push-pull" relationship, it being necessary only to correctly phase the coils so that the desired direction of operation of piston 20 carrying electrode 10 is obtained with a reversal of polarity across the coils. In the present instance, coils 42, 44 are connected in series. It will be seen that valve 38 incorporates a sensitive first stage and a second stage which is operable in response to operation of the quickly acting first stage. A hydraulic amplification is present in valve 38 which causes the relatively low differential pressure developed in its first stage to be amplified in the second stage in such a manner that relatively high pressures are available as required to operate the power feed piston 20.

The first, electrically operated stage of valve 38 is controlled by a flapper 70. Flapper 70 has a central pivotal mounting indicated at point 72 and its positioning is governed by permanent magnet 74 and by the action of coils 42, 44, which add or subtract flux in accordance with their selected energization. An insulating portion of non-magnetic material is indicated by the numerals 75, a, b, c, d which is preferably constructed in one integral part. In the operation of valve 38 in a balanced or null condition, fluid flow is through inlet port 64, around land portion 78 of spool 40, through passage 80, filters 82, passages 84 and 88 to fixed restrictions 85 and 87, to nozzles 90 and 92 which are directed toward respective end portions of flapper 70. It will be seen that passages 94 and 96 are open to fluid flow but, in the balanced condition of the servo valve, no spool displacement or operating fluid output results.

Let us assume that the polarity of terminals 98–100 as shown in FIGURE 1 is such that downfeed of electrode 10 is called for. In such instance, coils 42, 44 are energized in such polarity that flapper 70 is attracted toward nozzle 92 and away from nozzle 90. As flapper 70 has a movement toward nozzle 92, increased pressure is developed in passage 96 through action of restriction 87 and decreased pressure results in passage 94 through action of restriction 85. The movement of spool 40 is then initiated in a rightward direction. This subjects port 34 to the full pressure of port 64 and port 36 is opened to exhaust port 66 by the movement of land 102 of spool 40 to uncover passage 104. Thus, pressure is substantially increased at port 34 and correspondingly decreased at port 36. This causes a relatively higher force to be exerted against the upper face of piston 20 than against its lower face and to initiate its downward movement. Upon the signalling of electrode retraction or backup from sensing circuit 99, coils 42, 44 are oppositely polarized to provide the opposite movement of flapper 70 causing pressure on port 36 and exhaust on port 34, whereby an upward movement of piston 20 is initiated. It will be seen that valve 38 may be characterized as a closed center valve i.e. one in which the valve operating lands 76, 78, and 102 have operating surfaces which are substantially coextensive with the area of the port openings which they control. Otherwise stated, in the null position of the valve operating cylinder 40, there is no fluid flow permitted through the output ports 34, 36.

The advantage of the use of a two-stage valve in operation of the instant power feed system is believed evident when it is considered that redistribution of fluid pressures from the first valve stage may result in only one or two pounds net differential force on spool 40. Cylinder 22 may be operated at 1000 p.s.i. or more and have a ram area of 10 square inches or more to generate up to 50,000 pounds of force. To operate spool 40 directly with sufficient sensitivity would be extremely difficult, while operation of flapper 70 with the relatively small electrical forces available is entirely practical. Thus, a sensitive, quick acting and high power feed mechanism results.

Figure 3:
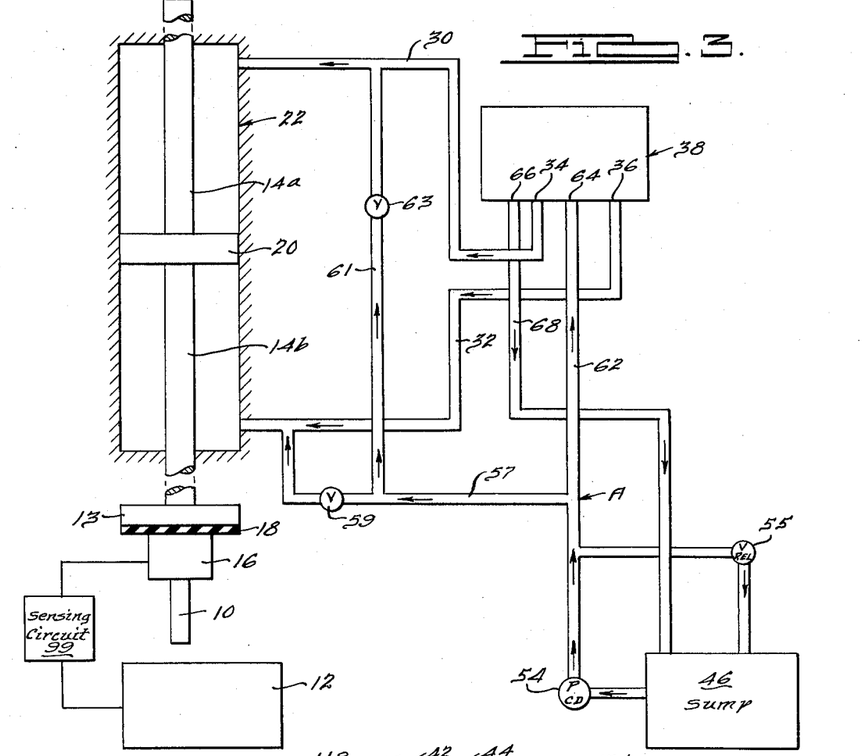
FIGURE 3 is an alternate embodiment of the invention as shown in FIGURE 1.

FIGURE 3 shows an alternate embodiment of the invention as shown in FIGURE 1. The basic components of the hydraulic system including pump 54 and servo valve 38 remain the same. However, the design of the fluid motor portion of the hydraulic system has been altered to provide two rods 14a and 14b mounted on piston 20. Rods 14a and 14b are of substantially equal cross sectional area so that the upper and lower faces of piston 20 are equal. Flow restrictions to provide properly regulated balancing forces on the faces of piston 20 are incorporated in conduits 57 and 61, again are embodied as flow control valves 59 and 63, while exhaust conduits 65 and 67 have been eliminated. It should be noted that while conduits 57 and 61 are connected to a common source of constant pressure, namely pump 54, they may as effectively be connected to any source providing a fixed pressure point such as, for example, an external source of pressure or the sump, representing a point of zero pressure, itself.

Figure 4:
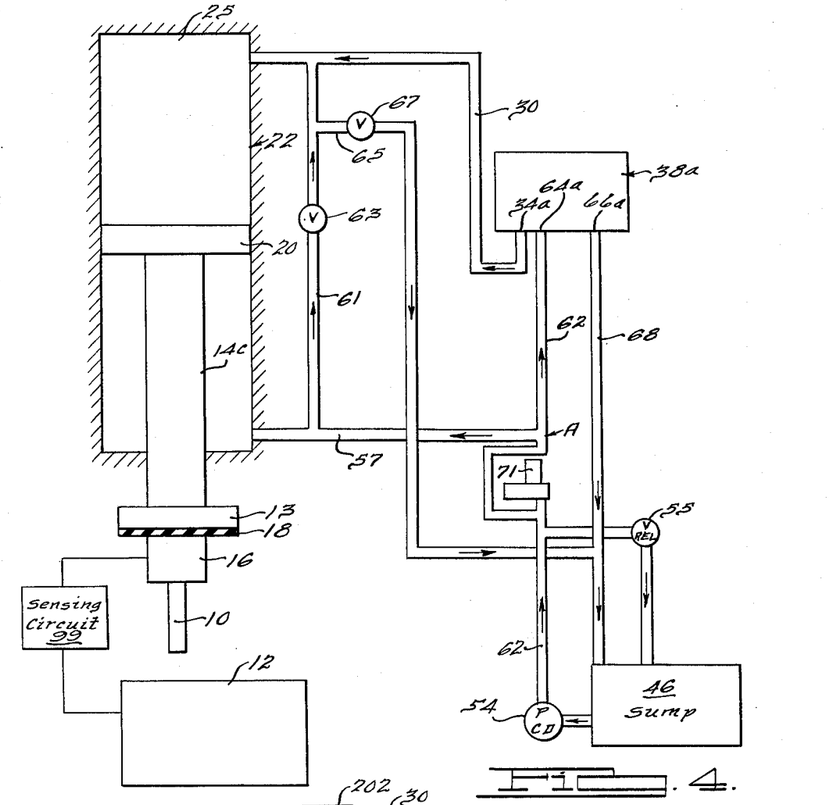
FIGURE 4 is a further embodiment of the present invention further distinguished by the incorporation of a directional control valve of the three-way or single control port operating type.

FIGURE 4 shows a further embodiment of the present invention in which four-way valve 38 has been replaced by a three-way directional control valve 38a. Three-way directional control valves are well known in the hydraulic art and may be characterized as having three conduit connections; one from the pressure source, a second to the reservoir or sump, and a third providing a single variable output line to one end of the work cylinder. Valve 38a is also a two stage valve in which the first stage is electrically operable in response to control signals from sensing circuit 99 and is essentially similar to that shown in FIGURE 2 for valve 38. The second stage has incorporated in it a three-way spool valve of the type well known in the art in which differential positioning of its spool provides a variable control output from a single outlet port 34a which is directed through conduit 30, through the upper head 25 of cylinder 22, and against the upper face of piston 20. Also diagrammatically shown are the inlet port 64a receiving operating fluid from pump 54 and exhaust port 66a returning fluid to sump 46. Included in conduit 62 downstream of pump 54 is an arrangement of a gas accumulator 71 and relief valve 55 which assist in maintaining a point of predetermined fixed pressure at point A. As a means of providing the required force balancing system for piston 20 at a null point, a pair of conduits 65 and 61 are utilized between the point of fixed pressure A and head 25 of cylinder 22. Included in conduit 61 is a flow control valve 63. Exhaust conduit 65 extends from conduit 61 at a point downstream of valve 63 to return fluid to sump 46. Exhaust conduit 65, in a manner similar to FIGURE 1, has therein included a flow control valve 67. As will be apparent from FIGURE 4, the differential positioning of piston 20 is accomplished by variable fluid output from valve 38a to its upper piston face. The balanced force system establishing a null position of the piston 20 comprises the oppositely directed fluid pressures through unrestricted conduit 57 and restricted conduit 61 against its respective faces. Again it should be noted that, in a manner similar to that shown in FIGURE 1, a single rod arrangement including rod 14c for the support of electrode 10 is employed. Rod 14c in this instance is of larger cross section and for equal advance and retract characteristics is ½ the area of piston 20.

Figure 5:
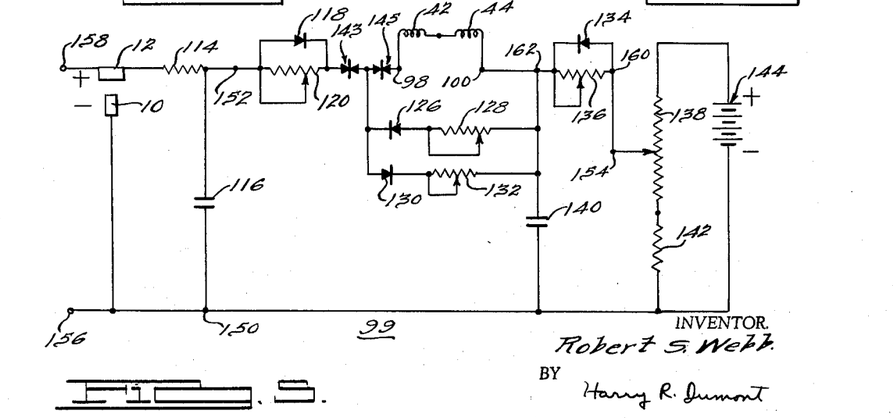
FIGURE 5 is a schematic diagram showing the sensing circuit 99 which is responsive to an electrical characteristic of the gap and controls operation of the directional control valve.

FIGURE 5 shows a schematic diagram of sensing circuit 99 which provides the electrical control for coils 42 and 44 in the first, electrically operable stage of servo valve 38. The electrode 10 and workpiece 12 are connected across an electrical discharge machining power supply of pulsating direct current voltage represented by the terminals 156, 158. The power supply may be of the RC relaxation oscillator type well known in the electrical discharge machining art and adequate to supply requisite voltage for causing discharge across the gap between electrode 10 and workpiece 12 in accordance with the characteristic of the circuit or may be of other more advanced pulser types. A sensing network comprising a resistor 114 and a capacitor 116 is connected across the machining gap. This is a standard sensing network which presents at terminals 150, 152, the average voltage present across the gap. The terminal 150 is connected to the negative side of reference voltage source 144. The terminal 152 is connected through a rheostat 120 and a pair of double anode reference diodes 143, 145 to valve terminal 98. The reference voltage 144 is connected in parallel with a potentiometer 138, a limiting reisstor 142 being connected in series. Limiting resistor 142 is included because operation of this circuit at voltages below 20 volts is unsatisfactory in many instances. Valve control coils 42, 44 are connected in series between terminals 98 and 100. Terminal 100 is connected through a rheostat 136 to terminal 154 which is the adjustable voltage terminal of potentiometer 138. Rheostat 136 is further shunted by a diode 134. A rheostat 128 is series connected with a diode 126 across servo coil terminals 98 and 100 and a parallel rheostat diode combination 132, 130 is similarly connected, the diode 130 being of opposite polarity to diode 126. The circuit is completed by capacitor 140 which connects terminal 100 with terminal 150.

In this circuit, a difference in voltage between terminal 152 which is at a potential of the average input voltage at the working gap and terminal 154 which is at a potential of the preset balance reference voltage is presented to the coils 42, 44 for controlling the electrode position. In actual practice, rheostats 120, 136 and 138 may be ganged together to form the gap reference network.

It will be seen that, in operation, sensing circuit 99 has a performance which is particularly advantageous and developed especially for use in this type of servo system in that there is provided a deadband or range of "no operation" about the reference voltage setting. By reason of the inclusion of one or more double anode reference diodes 143, 145 the problem of minute voltage unbalances between the sensing network and the reference network is eliminated. A difference equal to the amount of regulating voltage of the double anode reference diodes must exist between the sensing and reference networks before any operative voltage is supplied to the servo coils 42, 44. As an example, if the regulating voltage of diode 145 is two volts and that of diode 143 is ten volts, a net difference of at least 12 volts must exist between the voltage at points 152 and 154 before any electrical control signal is applied to the servo coils. This means that in the example given, in order to cause downfeed, the gap voltage must increase above the reference voltage by 12 volts in order to produce a downfeed signal and, oppositely, it must drop 12 volts below the reference voltage in order for a backup signal to be applied. This eliminates the continual hunting variance of the servo system during a normally acceptable gap voltage condition. Gap voltage provides the ideal characteristic to be sensed because the changes in gap voltage over a relatively wide range result in no loss in efficiency. A servo system maintaining gap voltage within this "dead center" range provides a mode of operation distinctly different from that utilized in known prior art systems. With this improved system, continuous hunting of the system about the reference voltage is eliminated and it is possible for the electrode 10 to move in the smallest discrete steps that can be achieved by the system. This method of operation is particularly important at the low feed rates of .001 inch per minute or less since continuous feed at this rate of advance is virtually impossible.

With further reference to the FIGURE 5, it will be seen that rheostat 132 and diode 130 determine the level of excitation of coils 42, 44 and the velocity of the downfeed of the electrode. Similarly, rheostat 128 and diode 126 provide the backup velocity control. The incorporation in the circuit of capacitor 140 additionally serves to act as a factor in eliminating over-travel of electrode 10, particularly when it is advancing downwardly. Capacitor 140 also serves to stabilize the performance of the circuit provided that the RC time constant is not less than approximately 20 times that of the machining time constant. During backup of the electrode 10, diode 134 shorts out rheostat 136 and terminal 162 and capacitor 140 remains for an appreciable time at the potential of point 154, thus allowing quick recovery after a short circuit condition at the gap.

Figures 7, 10:
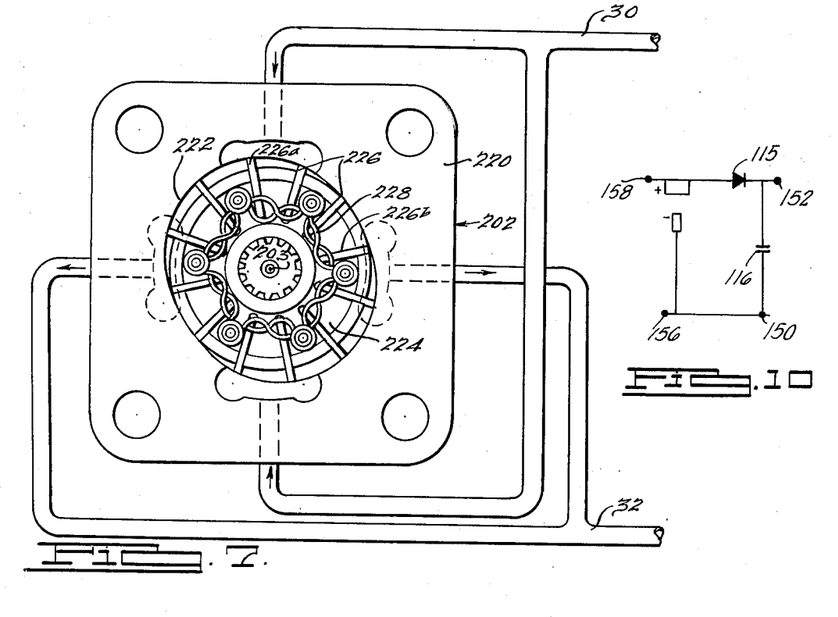
FIGURE 7 is an elevational view, with end plate removed, of the rotary type hydraulic motor of FIGURE 6.
FIGURE 10 is a schematic diagram showing an alternate form of sensing network for incorporation in FIGURE 5.

The control circuit of FIGURE 5 is adapted to be used with a sensing network which responds to peak gap voltage or gap striking voltage as is shown in FIGURE 10. By the substitution of a diode 115 for resistor 114, it will be seen that capacitor 116 will store gap striking voltage, which level will be reflected at point 152.

By "striking voltage" is meant that gap peak voltage that exists for sufficient time just prior to each gap discharge to breakdown and ionize the dielectric filled gap thereby causing the discharge. The time required for the dielectric breakdown is somewhat dependent upon the magnitude of voltage for a particular gap but is in the order of a microsecond. Transient voltages of much higher voltage and much shorter duration may exist across the gap without causing breakdown and are thus not included.

FIGURE 6 illustrates an alternate embodiment of the present invention in which a hydraulic fluid motor 202 of the rotary actuator type is coupled to drive a mechanical gear train to effect the positioning of electrode 10. Fluid motor 202 has connected to its output shaft 203 a spur gear 204. Spur gear 204 meshes with gear 206 which is rigidly secured to the upper end of lead screw 208. Spur gear 206 may be of a split type construction and spring preloaded to eliminate backlash between it and gear 204. Lead screw 208 is connected to a ram 210 by threadably engaging a spring loaded ball-nut assembly 212. Thrust bearing 214 is utilized to permit rotation of lead screw 208 when it is driven by the rotation of gear 206. Rotation of lead screw 208 through its threaded engagement with nut assembly 212 causes ram 210 to advance or retract the electrode 10 in accordance with the direction of rotation of lead screw 208. The rotation and lateral displacement of ram 210 is prevented by proper adjustment of gibs 218 and 218 which in turn are attached to the rigid portion of machine column 220.

FIGURE 7 shows a hydraulic motor 202 of the rotary type as connected in servo systems of the type illustrated in FIGURE 1 or FIGURE 3. Control fluid flow from conduits 30 and 32 is directed in the manner illustrated to provide reversible action of motor 202. Motor 202 is shown with its end plate removed and comprises a body 220 having an internal cam ring 222, a rotor 224 and a plurality of laterally disposed vanes 226 mounted on rotor 224. It will be seen that each pair of vanes, as for example 226a and 226b, are mounted in a complementary fashion at 90° displacement from each other on rockers 228 which in turn are pivotally supported and preloaded at each end of rotor 224 to provide an outward force on the vanes tending to extend them into engagement with the outline of cam ring 222. Thus, as each vane is being pushed in by cam ring 222, its complementary vane is being pushed outwardly by their rocker 228. The direction of rotation of the rotor 224 and, consequently, the output shaft 203 is dependent upon the relative pressures exerted through conduits 30 and 32 and the reversible inlet-outlet ports of motor 202.

Figures 8, 9:
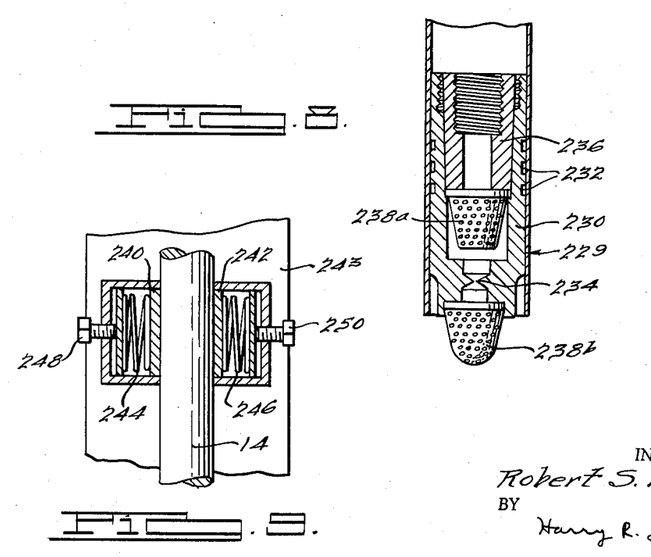
FIGURE 8 is a cross-sectional view of fixed orifice, flow restrictive means which may be utilized in place of certain flow control valves in the apparatus of FIGURES 1, 3, and 4 to provide an alternate embodiment of the present invention.
FIGURE 9 is a sectional view of a means for applying a selectively controlled static friction which may be utilized in the systems of FIGURES 1, 3, 4, and 6.

FIGURE 8 is a cross sectional view of a fixed orifice, flow restrictive means 229 which may be utilized in the servo systems of FIGURES 1, 3 and 4 and in place of the several flow control valves 59, 63, 67 and 69 shown therein. The flow restrictive means comprise a jet body 230 having a peripheral grooved portion 232 and an orifice portion 234 of a predetermined size and so proportioned as to provide for turbulent flow therethrough. It should be noted that, in servo systems of this type, the normal construction of servo valve 38 and 38a and certain other factors in the system contributing to leakage result in turbulent flow conditions and, therefore, orifice portion 234 must be constructed to produce turbulent flow. Turbulent flow may be characterized by the fact that changes in viscosity and hence changes in temperature do not cause a change in flow rate through a given orifice. Non-turbulent flow, on the other hand, does change with viscosity as is well known in the hydraulics art. Since the servo valve 38 is itself of turbulent flow construction it is, therefore, essential that the orifice portions 234 are also of turbulent flow construction so that the match of centering conditions is maintained regardless of changes in fluid viscosity or temperature. This is accomplished by the design of body 230 so that the length of the passage of orifice 234 is extremely small relative to its cross sectional area. It has been found that fixed orifice, flow restrictive devices having the trade name "Lee Jets" manufactured and sold by the Lee Company of Westbrook, Connecticut are particularly suitable for the present use. The flow restrictive means additionally includes a tapered expander plug 236 which, when driven into the opening of body 230 expands the body so that its peripheral grooved portion 232 is securely seated into the adjacent walls of the conduit in which it is mounted. Also included are a pair of filter screens 238a and 238b which provide bidirectional filtering to avoid blocking of the minute passageway through orifice portion 234.

FIGURE 9 shows a pair of friction shoes 240, 242 which may be utilized in the servo feed systems of FIGURES 1, 3 and 4 for selectively adjusting the static friction in the system. It has been found that operation of such servo systems may be greatly improved by the incorporation of means for selectively adjusting the static friction of the system. It has further been found that, for best operation, the static friction force present should be approximately equal to 5% of the maximum force available from the piston. For this purpose, friction shoes 240, 242 are mounted on vertical machine column 243 and extend forwardly therefrom and into engagement with the piston rod 14 or other suitable portions of the electrode bearing mechanism. Friction shoes 240, 242, further, are spring biased into engagement with diametrically opposite portions of rod 14 by the action of springs 244 and 246, respectively. Adjusting screws 248 and 250 are provided for selectively varying the spring pressure and, hence, the static friction effective on rod 14. It will be noted that the structure of FIGURE 9 has a similar purpose to the gear train mechanism shown in FIGURE 6 namely that of stabilizing the electrode feed mechanism against disturbing forces such as that exerted by coolant pressure in the axial direction or of weight of the electrode and supporting structure. Friction shoes 240, 242 may be incorporated in the servo feed system of FIGURE 6 in engagement with suitable portions of the electrode bearing mechanism as required, depending on the preloading or inherent friction of the gears.

DECRIPTION OF OPERATION

With reference to FIGURES 1 and 2, it will be seen that the downfeed and backup of electrode 10 is controlled by electrical signals representative of gap spacing received by the first or electrical stage of directional control valve 38. If reversal of feed is directed by a change of polarity at terminals 98 and 100, the spool 40 of valve 38 must undergo a reversal of poistion past its central or null position where no difference of pressure is communicated through conduits 30 and 32 to command the upward or downward movement of piston 20. Where machining conditions are at an optimum at an exceedingly close gap spacing of electrode 10 and workpiece 12, it will be seen that a constant hunting i.e. upward and downward movement of the electrode results without the advantages of the present invention. The objections mentioned above in a standard hydraulic system are such that stability of the machining operation is impaired. Overrun in a downward direction can cause the electrode 10 to strike the workpiece 12 and result in damage to both. Use of mechanical biasing means such as, for example, centering springs does not present a solution to this problem because of their non-linearity of flexure, proneness to fatigue and other like factors. To provide for establishing a null position of the piston 20, a more reliable prebiasing force system is required. This may be accomplished through the expedient of providing selectively preset opposing fluid forces to the motive element of the fluid motor, that is, to the faces of piston 20 through flow restrictive means connected between opposing faces of piston 20 and a fixed pressure point. The flow restrictions may be incorporated directly in the fluid supply lines utilized. It was found to be advantageous to utilize a common constant pressure source from pump 54 both to operate the directional control valve 38 and to provide a point of fixed pressure for balancing piston 20 at a null point. By making the restriction adjustable, as by the incorporation of flow control valves 59, 63, 67 and 69, the balancing system can be preset to compensate for variations in the system arising from such factors as different levels of static friction operating on the piston, changes in weight of electrode or supporting structure, shift of null point of valve 38 due to temperature changes or other factors, and variance in coolant force which may result from varying pressure or effective area and may exert appreciable upward and disturbing forces on the piston. It should be further noted that the operative faces of piston 20 differ in area because of rod 14 and this requires the application of opposite and different forces through conduits 32 and 30 to achieve a properly balanced stationary position of the piston. By selective change of the balancing forces applied to piston 20, it is possible to permit its initial movement at any desired position at or near null of valve 38. In other words, the present invention affords a ready and poistive means for predetermining the null characteristics of the system.

One of the most important advantages afforded by the present invention is that the electrode or ram may be maintained in an absolutely stationary or fixed position during electrode setup. As described above, it is necessary to make mechanical measurements and adjustments during the mounting of the electrode and prior to machining. Present systems employ elaborate and ineffective balancing mechanisms or provide ram locks and pressure interlocks with the hydraulic system in an effort to maintain the electrode in a fixed position during setup. These provisions have been found to be ineffective frequently contributing to loss of accuracy, and, because of the inherent characteristics of the valve and the system itself, are subject to continual change. In other words, a preset balancing system may provide momentary balance of the ram only to have it disturbed by a slight change in temperature or contamination of components in the hydraulic servo system.

In some instances, restrictions of the fixed-orifice, turbulent flow type as shown in FIGURE 8 may be preselected for a given machine construction and thus require no attention of the operator in readjusting of the various control orifices. Where the machine construction is such that the normal electrodes mounted in the machine or the type of operations to be done result in a relatively heavy electrode or may under some circumstances operate with relatively large coolant forces, use of adjustable flow control valves is preferred. In the system of FIGURE 1, normally, flow control valves 59 and 63 should provide a larger orificed restriction than flow control valves 67 and 69. During null or static set-up conditions, valve 63 is normally adjusted so that the pressure in the upper chamber of the cylinder is less than the pressure in the lower chamber by a sufficient amount to compensate for the difference in piston face area and the weight loading of the piston rod 20 and associated mechanism. A typical servo valve such as valve 38 has a port width and a length of travel of about .040 inch for full flow characteristics. Thus in the system of FIGUE 1, the larger restrictions provided by valves 59 and 63 may provide for approxiamtely 10% of the full flow. Therefore, their hole sizes may be approximately 10% of the full, open port size of servo valve 38. Under conditions where extremely large and heavy electrodes are used for machining large stamping or forging dies, the adjustment of other valves in addition to valve 63 may be required. As valve 63 is closed, pressure in the upper head portion of cylinder 22 is reduced, tending to cause backup to compensate for the weight of the electrode. Where the unbalance is substantial, it may be necessary to open valve 59 at the same time to apply increased pressure to the lower head portion of cylinder 22. Thus, operation of valves 63 and 59 is oppositely phased and the two may be ganged together to form a single balancing control. After setup, the electrode 10 may be advanced toward the workpiece 12 under manual control to a point where full coolant force engages the face of the electrode. Should this force be sufficient to cause an upward motion of the system in the absence of an electrical control signal from sensing circuit 99, a downward biasing of the system is required and valves 59 and 63 may be oppositely adjusted. It will be understood that operation of one valve alone is possible, or, conceivably, operation of all four valves may be necessary to achieve proper adjustment under varying conditions present in the system.

FIGURE 3 shows a servo-feed system having a mode of operation substantially similar to that of the system of FIGURE 1. It will be observed, however, that by reason of the incorporation of rods 14a and 14b, the operative areas of the piston 20 faces are substantially equal. The balancing forces required are then usually controlled by the presetting of flow control valves 59 and 63 alone. Thus, in the absence of appreciable differences of fluid output from outlet ports 34 and 36, the piston 20 will be maintained in any stationary position to which it has previously been advanced. Where substantial unbalance in forces exists as with heavy electrodes or supporting structure or large coolant forces, the four restriction system of FIGURE 1 is required even with the double rod system of FIGURE 3.

FIGURE 4 provides an additional embodiment of the present invention in which a single rod 14c is employed which is of relatively large diameter as compared to rods 14, 14a, and 14b of FIGURES 1 and 3, respectively. Use of a three-way, directional control valve 38a in place of a four-way directional control valve 38 provides a single, variable output to control the movement of piston 20. Again, a force balancing system is employed through conduits 57 and 61 to provide opposite and balancing forces to the faces of piston 20. Since a constant, upward, unrestricted reference force is required on piston 20, no flow control valve is required in conduit 57. By the selective presetting of either or both of valves 63 and 67, a stationary positioning of piston 20 and, consequently, of electrode 10 may be achieved.

By reason of the mode of operation previously discussed for the circuit of FIGURE 5, it will be seen that the electro-hydraulic servo system of the present invention is electrically controlled in such a manner that the electrical circuit is stabilized with respect to the electrical control signal provided to the first stage of directional control valve 38 or 38a in the systems of FIGURES 1, 3, 4 and 7. This is accomplished as has been emphasized through the establishing of a null, "dead center," voltage range of operation by reason of the inclusion of double anode reference diodes 143, 145 in the circuit of FIGURE 5. The hydraulic servo system is further stabilized with respect to its fluid motor components by the inclusion of the prebiasing fluid pressures through the system as best shown in FIGURES 1, 3 and 4.

The alternate embodiment as shown by FIGURE 6 provides a servo system which is balanced exactly on null because of the action of the fluid prebiasing system of the present invention. Change in downward force of the electrode assembly or in the upward force of the coolant pressure tend to produce a self-locking condition of lead screw 208. In other words, it is possible to drive screw 208 only by the action of the appropriate gears and an axial load in either direction upon lead screw 208 causes no displacement of the system.

It will thus be seen that, by the present invention, I have provided an improved fluid actuator system of particular value when incorporated in a servo feed system for electrical discharge machining. While the principles of my invention have been embodied in electrical machining apparatus by way of illustration, it will be seen that my invention is equally applicable to any fluid actuated, servo-feed system.

I claim:

1. A fluid actuator system comprising a cylinder, a piston differentially positionable in said cylinder, a directional control valve operatively connected to provide fluid flow to said piston for selectively controlling its positioning, means for applying a balancing pressure at a null output condition of said directional control valve to maintain said piston stationary comprising a flow restrictive means connected between at least one end of said cylinder and a fixed pressure point, and means operatively connected to said piston for establishing a static friction force resisting its movement.

2. A fluid actuator system comprising a cylinder, a piston differentially positionable in said cylinder, a source of constant pressure fluid, a directional control valve operatively connected to said piston through a first and second conduit for selectively controlling its positioning, a third conduit connecting said source to one face of said piston, a fourth conduit connecting said source to the other face of said piston, and a flow control valve connected in at least one of said third and fourth conduits for presetting the fluid flow therethrough for maintaining said piston stationary at a null point.

3. A fluid actuator system comprising a cylinder, a piston differentially positionable in said cylinder, a source of constant pressure fluid, a four-way directional control valve connected to said source, said control valve having a pair of output conduits to provide control fluid flow to both faces of said piston, a first conduit including a first flow control restriction and connecting said source to one face of said piston, a second conduit including a second flow control restriction and connecting said source to the other face of said piston, a sump, a third conduit communicating between said second conduit at a point downstream of said second flow control valve and said sump, and a third flow control restriction connected in said third conduit to maintain said piston in a stationary position at and near a null output condition of said directional control valve.

4. The combination as set forth in claim 3 in which said flow control restrictions are embodied as flow control valves, at least one of said valves being presettable to provide a predetermined biasing force to said piston.

5. A fluid actuator system comprising a cylinder, a piston differentially positionable in said cylinder, a four-way directional control valve operable to provide a control fluid flow through a pair of output conduits to both faces of said piston, a constant pressure source, a first conduit including a first flow control restriction and connected between one face of said piston and said constant pressure source, a second conduit including a second flow control restriction and connected between the other face of said piston and said constant pressure source, a first exhaust conduit including a flow control restriction connected to said second conduit at a point downstream of said second flow control restriction, a second exhaust conduit including a flow control restriction and connected at a point downstream of said first flow control restriction, said restrictions being operable to provide a biasing force to said piston to maintain it in a stationary null position.

6. The combination as set forth claim 5 in which at least one of said restrictions is presettable to provide a predetermined biasing force to said piston.

7. A fluid actuator system comprising a cylinder, a piston differentially positionable in said cylinder and having a rod extending from one end, a three-way directional control valve operable to provide a control fluid flow through an output conduit to one face of said piston, a constant pressure source, a first conduit connected between said source and the rod end of said cylinder, a second conduit connected between said source and the other end of said cylinder, a flow control restriction connected in said second conduit, an exhaust conduit connected to said second conduit downstream of said flow control restriction, and a flow control restriction connected in said exhaust conduit, both the aforesaid flow control restrictions operable to maintain said piston stationary at a null output condition of said directional control valve.

8. The combination as set forth in claim 7 in which at least one of said restrictions is presettable to provide a predetermined biasing force to said piston.

9. In an electrical machining apparatus having an electrode adapted to be maintained in constant gap relationship with a workpiece, a servo feed system comprising a hydraulic motor having reversible inlet-outlet ports and including a motive element differentially movable in response to variances in operating fluid flow therethrough, an output means of said motor connected to said element and operable to provide a relative movement between said electrode and workpiece, a directional control valve of the closed center type, said directional control valve having its output operatively connected to said motive element through at least one output conduit for controlling its movement, and means for applying a balancing pressure at null to maintain said motive element stationary comprising flow restrictive means operatively connected in balancing a force conduit, said conduit communicating between at least one port of said motor and a fixed pressure point.

10. In an electrical machining apparatus having an electrode adapted to be maintained in constant selected gap relationship with a workpiece, a servo feed system comprising a hydraulic cylinder, a piston differentially positionable in said cylinder, a rod connected to said piston and operable to provide a relative movement between electrode and workpiece, a directional control valve of the closed center type operatively connected to provide fluid flow to at least one face of said piston for controlling its movement, and means for applying a balancing pressure at a null output condition of said directional control valve to maintain said piston stationary comprising a flow restrictive means connected between each end of said cylinder and a fixed pressure point.

11. In an electrical machining apparatus having an electrode adapted to be maintained in constant gap relationship with a workpiece, a servo feed system comprising a hydraulic motor of the rotary type, a rotor mounted therein, an output shaft connected to said rotor and operable to provide a relative movement between electrode and workpiece, a directional control valve of the closed center type having its output operatively connected to said rotor for controlling its rotation, and means for applying a balancing pressure at null to maintain said rotor stationary comprising a flow restrictive means operatively connected between inlet and outlet ports of said motor and a fixed pressure point.

12. In an electrical machining apparatus having an electrode adapted to be maintained in constant selected gap relationship with a workpiece, a servo feed system comprising a hydraulic cylinder, a piston differentially movable in said cylinder, a rod extending from one face of said piston and axially movable to provide relative movement between the electrode and workpiece, means operatively connected to said rod for predetermining the static friction force resisting its axial displacement, a source of constant pressure fluid, a directional control valve operatively connected to said piston through at least one output conduit for selectively controlling its movement, a first balancing conduit connecting said source to one face of said piston, a second balancing conduit connecting said source to the other face of said piston, and a restriction connected in at least one of said balancing conduits for maintaining a balancing pressure to hold said piston stationary at a null point of said directional control valve.

13. In an electrical machining apparatus having an electrode adapted to be maintained in constant selected gap relationship with a workpiece, a servo feed system comprising a hydraulic cylinder, a piston differentially movable in said cylinder, a rod extending from one face of said piston for providing relative movement between the electrode and workpiece, a source of constant pressure fluid, a four-way directional control valve connected to said source and operable to provide a control fluid flow through a pair of conduits to both faces of said piston, a first conduit including a first restriction and connecting said source to one face of said piston, a second conduit including a second restriction and connecting said source to the other face of said piston, a sump, a third conduit connected between said second conduit at a point downstream of said second restriction and said sump, and a third restriction connected in said third conduit, all the aforesaid restrictions operable to maintain said piston in a stationary position at the null and near null conditions of said directional control valve.

14. The combination as set forth in claim 13 in which said restrictions are presettable to provide a predetermined biasing force to said piston.

15. In an electrical machining apparatus having an electrode adapted to be maintained in constant selected gap relationship with a workpiece, a servo feed system comprising a hydraulic cylinder, a piston differentially movable in said cylinder, a rod extending from one face of said piston and operatively connected to provide relative movement between the electrode and workpiece, a source of constant pressure fluid, a three-way directional control valve operatively connected between said source and having its output connected to the end of said cylinder opposite said rod for selectively controlling the movement of said piston, a first conduit connected between said source and one head of said cylinder, a second conduit connected between said source and the other head of said cylinder, a restriction connected in said second conduit, a sump, a third conduit communicating between a point on said second conduit downstream of said restriction and said sump, and a restriction connected in said third conduit, both the aforesaid restrictions operable to maintain said piston stationary at a null point.

16. The combination as set forth in claim 15 in which at least one of said restrictions is presettable to provide a predetermined biasing force to said piston.

17. In an electrical machining apparatus having an electrode adapted to be maintained in constant gap relationship with a workpiece, a servo feed system comprising a hydraulic motor of the rotary type having reversible inlet-outlet ports, a rotor mounted therein, an output shaft connected to said rotor and operable to provide a relative movement between the electrode and workpiece, a source of constant pressure fluid, an electrically operable, four-way directional control valve of the closed center type operatively connected to said source and having its output operatively connected to said rotor through a pair of output conduits for controlling its rotation in response to an electrical signal representative of an electrical characteristic of the gap, first and second balancing conduits, each connected between said source and one of said ports of said motor, respectively, and a restriction connected in each of the aforesaid balancing conduits to maintain a balancing pressure to hold said rotor stationary in the absence of an electrical control signal to said directional control valve.

18. In an electrical machining apparatus having an electrode adapted to be maintained in constant selected gap relationship with a workpiece, an electro-hydraulic servo feed system comprising a hydraulic cylinder, a piston differentially movable in said cylinder, a rod connected to said piston and axially movable to provide a relative movement between electrode and workpiece, a pair of friction applying members operatively connected to said rod for predetermining the static friction force resisting its axial movement, a network for sensing an electrical characteristic of the gap, an electrically operated directional control valve connected to the output of said sensing network and operable to provide fluid flow to at least one face of said piston for controlling its movement, and means for applying a balancing pressure to maintain said piston stationary in the absence of an electrical output from said sensing network comprising a flow restrictive means connected between at least one end of said cylinder and a fixed pressure point.

19. In an electrical discharge machining apparatus having an electrode adapted to be maintained in constant selected gap relationship with a workpiece, an electro-hydraulic servo feed system comprising a hydraulic cylinder, a piston differentially movable in said cylinder, a rod connected to said piston and operable to provide a relative movement between the electrode and workpiece, a network for sensing an electrical characteristic of the gap, an electrically operated directional control valve of the closed center type connected to the output of said sensing network and operable to provide fluid flow to at least one face of said piston for controlling its movement, and means for applying a balancing pressure to maintain said piston stationary in the absence of an electrical output from said sensing network comprising a flow restrictive means connected between at least one end of said cylinder and a fixed pressure point.

20. The combination as set forth in claim 19 wherein said network is operable to sense and provide an electrical output representative of gap striking voltage.

21. In an electrical machining apparatus having an electrode adapted to be maintained in constant gap relationship with a workpiece, a servo feed system comprising a hydraulic motor of the rotary type having reversible inlet-outlet ports, a rotor mounted therein, an output shaft connected to said rotor and operable to provide a relative movement between electrode and workpiece, a source of constant pressure fluid, a directional control valve of the closed center type having its output operatively connected by output conduit means to said rotor for controlling its rotation, a first balancing conduit connecting said source to one of said ports of said motor, a second balancing conduit connecting said source to the other of said ports of said motor, and a flow control restriction connected in at least one of said balancing conduits for presetting the fluid flow therethrough and maintaining a balancing pressure to hold said rotor stationary at a null point of said directional control valve.

22. In an electrical machining apparatus having an electrode adapted to be maintained in constant gap relationship with a workpiece, a servo feed system comprising a hydraulic motor of the rotary type having reversible inlet and outlet ports, a rotor mounted therein, an output shaft connected to said rotor and operable to provide a relative movement between the electrode and workpiece, a source of constant pressure fluid, a four-way directional control valve of the closed center type connected to said source and operable to provide through conduit means a control fluid flow for controlling the rotation of said rotor, a first conduit including a first flow control restriction and connecting said source to one of the ports of said motor, a second conduit including a second flow control restriction and connecting said source to the other port of said motor, a sump, a third conduit connected between said second conduit at a point downstream of said second flow control restriction and said sump, and a third flow control restriction connected in said third conduit, the aforesaid flow control restrictions operable to provide a force to said rotor to maintain it in a stationary position at the null and near null output conditions of said directional control valve.

23. The combination as set forth in claim 22 in which at least one of said restrictions is presettable to provide a predetermined biasing force to said piston.

24. In an electrical machining apparatus having an electrode adapted to be maintained in constant gap relationship with a workpiece, a servo feed system comprising a hydraulic motor of the rotary type, a rotor mounted therein, an output shaft connected to said rotor and operable to provide a relative movement between electrode and workpiece, a network for sensing an electrical characteristic of the gap, an electrically operated directional control valve of the closed center type connected to the output of said sensing network and operable to provide fluid flow through an output conduit means to said rotor through reversible inlet and outlet ports of said motor, a source of constant pressure fluid, a first balancing conduit connecting said source to one port of said motor, a second balancing conduit connecting said source to the other port of said motor, and a flow control restriction connected in at least one of said balancing conduits for presetting the flow therethrough and maintaining a balancing pressure to hold said rotor stationary in the absence of an electrical output from said sensing network.

25. In an electrical discharge machining apparatus having an electrode adapted to be maintained in constant gap relationship with a workpiece, a servo feed system comprising a hydraulic motor of the rotary type having reversing inlet-outlet ports, a rotor mounted therein, an output shaft connected to said rotor and operable to provide a relative movement between electrode and workpiece, a network for sensing an electrical characteristic of the gap representative of gap spacing, an electrically operated directional control valve connected to the output of said sensing network and operable to provide fluid flow of said rotor through said reversible inlet and outlet ports, a source of constant pressure fluid, a first conduit connecting said source to one port of said motor, a second conduit connecting said source to the other port of said motor, a sump, a third conduit connected between said second conduit and said sump, and a flow restrictive means of the fixed orifice, turbulent flow type incorporated in each of said conduits to provide a predetermined biasing force to said rotor to maintain it in a stationary position in the absence of an electrical output from said sensing network.

26. In an electrical discharge machining apparatus having an electrode adapted to be maintained in constant gap relationship with a workpiece, a servo feed system comprising a hydraulic motor of the rotary type having reversible inlet-outlet ports, a rotor mounted therein, an output shaft connected to said rotor and operable to provide a relative movement between electrode and workpiece, a network for sensing an electrical characteristic of the gap representative of gap spacing, an electrically operated directional control valve connected to the output of said sensing network and operable to provide fluid flow to said rotor through said inlet and outlet ports of said motor, a source of constant pressure fluid, a first conduit including a first restriction and connecting said source to one port of said motor, a second conduit including a second restriction connecting said source to the other port of said motor, a sump, a third conduit connected between said second conduit at a point downstream of said second restriction and said sump, and a third restriction in said third conduit, all the aforesaid restrictions being presettable to provide a predetermined biasing force to said rotor to maintain it in a stationary position independently of an electrical output from said sensing network.

27. In an electrical discharge machining apparatus having an electrode adapted to be maintained in constant selected gap relationship with a workpiece, an electro-hydraulic servo feed system comprising a hydraulic cylinder, a piston differentially movable in said cylinder, a rod extending from one face of said piston and operatively connected to provide relative movement between electrode and workpiece, a network for sensing an electrical characteristic of the gap, an electrically operated directional control valve of the three-way type operatively connected between said source and the opposite face of said cylinder for selectively controlling the movement of said piston in response to the output of said sensing network, a first conduit connected between said source and the rod end of said cylinder, a second conduit connected between said source and the other end of said cylinder, a flow restriction means connected in said second conduit, a sump, a third conduit communicating between point on said second conduit downstream of said flow control valve and said sump, and a flow restrictive means connected in said third conduit, said flow restrictive means operable to maintain said piston stationary in the absence of an electrical output from said sensing network.

28. The combination as set forth in claim 27 in which said flow restriction means are presettable to provide a predetermined biasing force to said piston.

29. In an electrical discharge machining apparatus having an electrode adapted to be maintained in constant selected gap relationship with a workpiece, an electro-hydraulic servo feed system comprising a hydraulic cylinder, a piston differentially movable in said cylinder, a pair of rods of substantially equal cross sectional area each extending from a different face of said piston, one of said rods operably connected to provide relative movement between the electrode and workpiece, a source of constant pressure fluid, a network for sensing an electrical characteristic of the gap representative of gap spacing, an electrically operated directional control valve of the closed center type connected to the output of said sensing network and operable to provide a selective control fluid flow through a pair of conduits to both faces of said piston, first and second balancing conduits, each connected between said source and a different head of said cylinder, and a restriction connected in each of the aforesaid balancing conduits for presetting the fluid flow therethrough to maintain a balancing pressure to hold said piston stationary in the absence of an electrical output from said sensing network.

30. A fluid actuator system comprising a hydraulic motor of the rotary type having reversible inlet-outlet ports, a rotor mounted therein, an output shaft connected to said rotor, a source of constant pressure fluid, an electrically operable, four-way directional control valve of the closed center type operatively connected to said source and having its output operatively connected to said rotor through a pair of output conduits for controlling its rotation in response to an electrical control signal, first and second balancing conduits, each connected between said source and one of said ports of said motor, respectively, and a restriction connected in each of the aforesaid balancing conduits to maintain a balancing pressure to hold said rotor stationary in the absence of an electrical control signal to said directional control valve.

References Cited by the Examiner

UNITED STATES PATENTS

| | | | |
|---|---|---|---|
| 2,177,098 | 10/1939 | Doe et al. | 91—417 X |
| 2,345,919 | 4/1944 | Davis | 91—416 X |
| 2,398,421 | 4/1946 | Frische et al. | |
| 2,807,706 | 9/1957 | Oezer | 219—69 |
| 2,924,200 | 2/1960 | Hanna et al. | 91—464 |
| 2,984,761 | 5/1961 | Webb | 314—61 |
| 2,984,985 | 5/1961 | MacMillin | 60—97 |

RICHARD M. WOOD, *Primary Examiner.*

JOSEPH V. TRUHE, *Examiner.*